United States Patent [19]

Zanin

[11] Patent Number: 4,576,100
[45] Date of Patent: Mar. 18, 1986

[54] CRANE FOR NUCLEAR WASTE HANDLING FACILITIES

[75] Inventor: Michael A. Zanin, Cuyahoga Falls, Ohio

[73] Assignee: AMCA International Corporation, Hanover, N.H.

[21] Appl. No.: 419,168

[22] Filed: Sep. 17, 1982

[51] Int. Cl.$^4$ .................. G21C 19/32; B61D 15/00; B66C 17/06

[52] U.S. Cl. .................. 105/49; 105/26 R; 105/163 R; 105/215 R; 212/206; 212/216; 250/517.1; 376/264; 376/272; 414/146

[58] Field of Search .......... 105/26 R, 26 A, 26 D, 105/163 R, 163 SK, 215 R, 215 C, 96.2, 49; 414/146, 292; 212/206, 216; 250/515.1, 517.1; 376/272, 264, 268

[56] References Cited

U.S. PATENT DOCUMENTS

| | | | |
|---|---|---|---|
| 3,019,742 | 2/1962 | Kershaw | 105/96.2 X |
| 3,113,915 | 12/1963 | Webb et al. | 250/515.1 X |
| 3,252,586 | 5/1966 | Kore et al. | 105/163 R X |
| 3,344,932 | 10/1967 | DeGasperis | 105/163 R X |
| 3,482,720 | 12/1969 | Tax et al. | 212/206 X |
| 3,606,029 | 9/1971 | Verlinde | 212/216 |
| 3,633,514 | 1/1972 | Deike | 105/215 C X |
| 3,940,628 | 2/1976 | Stock et al. | 250/517.1 X |
| 4,049,132 | 9/1977 | Strumback | 212/206 X |
| 4,226,332 | 10/1980 | McCaffrey | 105/163 R X |
| 4,481,165 | 11/1984 | Anderson et al. | 414/146 X |

FOREIGN PATENT DOCUMENTS 2528293 1/1977 Fed. Rep. of Germany ... 105/26 A

Primary Examiner—Randolph A. Reese
Attorney, Agent, or Firm—Renner, Otto, Boisselle & Lyon

[57] ABSTRACT

A crane for use in a nuclear waste handling facility is disclosed. The crane includes a bridge of sufficient transverse dimension to span the width of the area being serviced, a bridge drive for moving the bridge along spaced rails extending longitudinally along opposite sides of the area being serviced, and a crane control cabinet depending from a cantilevered support extending from one end of the bridge. The nuclear waste handling facility includes a stationary radiation barrier extending longitudinally in spaced relationship to one of the rails supporting the crane. The barrier is positioned between the bridge and the crane control cabinet. The disclosure also covers a crane that includes a bridge of sufficient transverse dimension to span the width of the area being serviced, the bridge including at least one horizontally elongated girder with an enclosed interior space having a cross-section of sufficient dimension to permit access to the interior space by operating personnel, the girder including a modular radiation barrier within its interior and a crane control facility within its interior. In a preferred embodiment, the crane has a trolley mounted on the bridge which is adapted for horizontal travel along the bridge and has a hoisting mechanism mounted on it. Advantageously, the bridge drive includes separate primary, secondary and teritiary drive mechanisms. The bridge and trolley are constructed to minimize the height of the trolley above the bridge and the width of the bridge.

20 Claims, 19 Drawing Figures

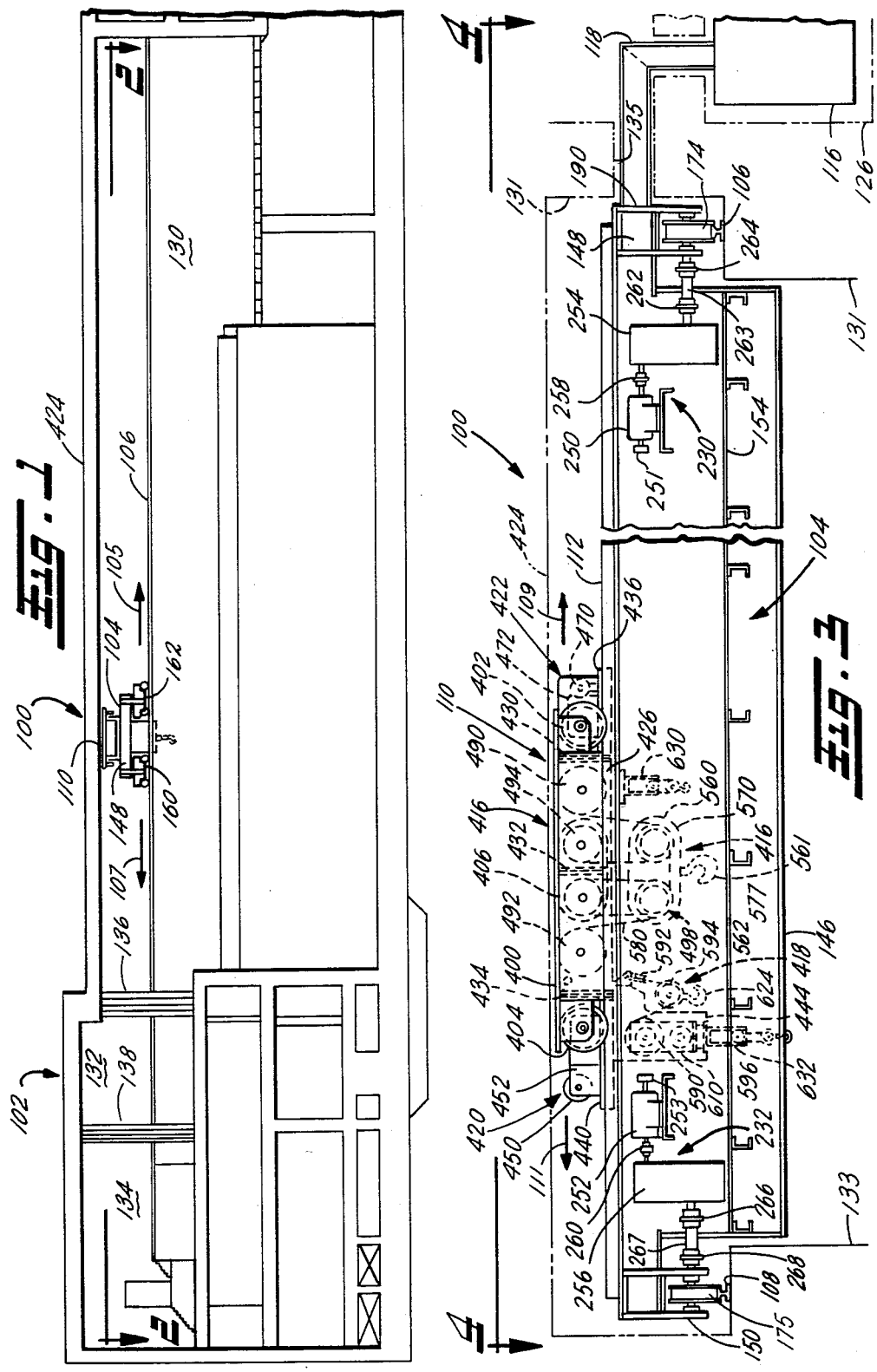

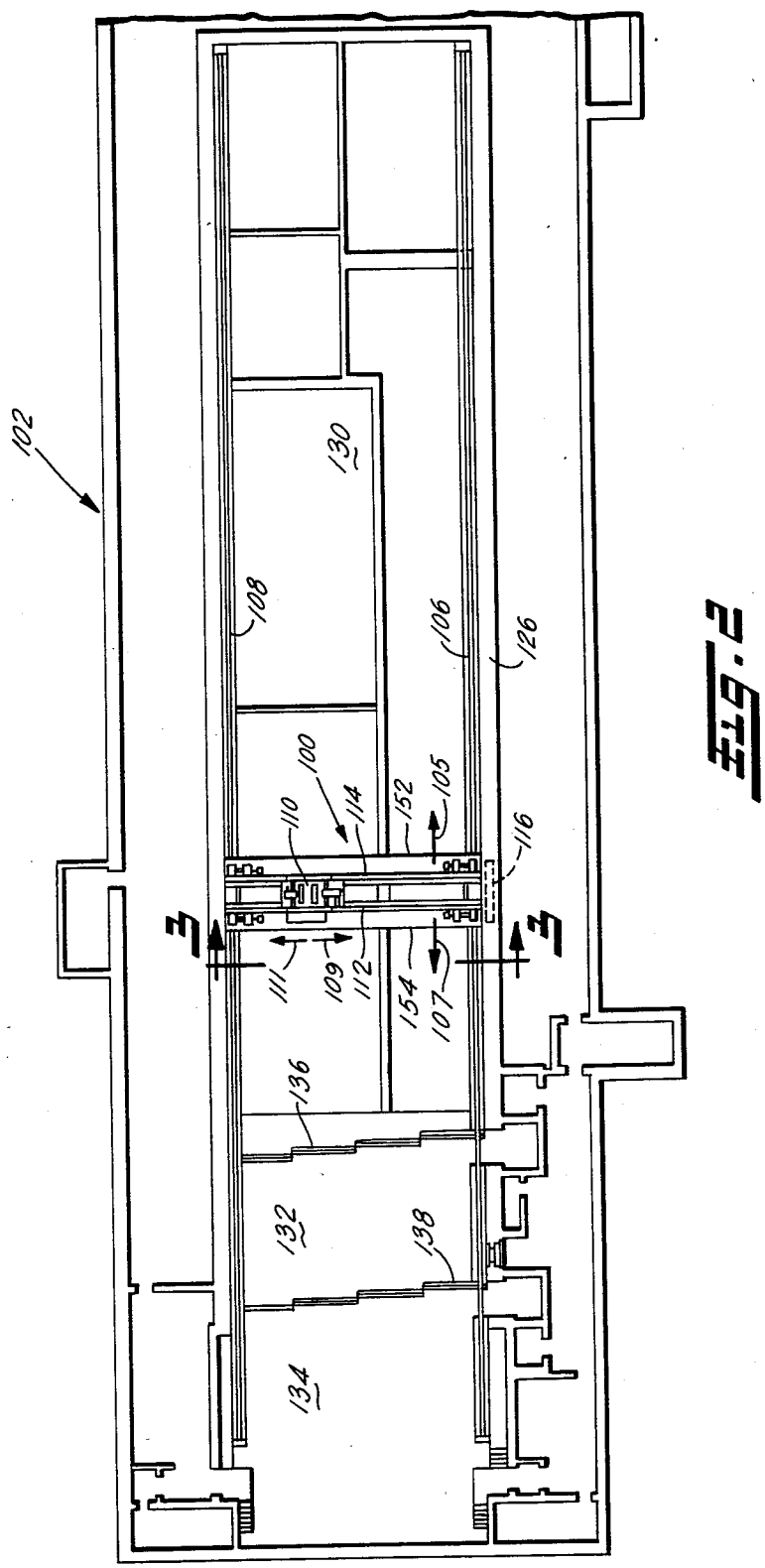

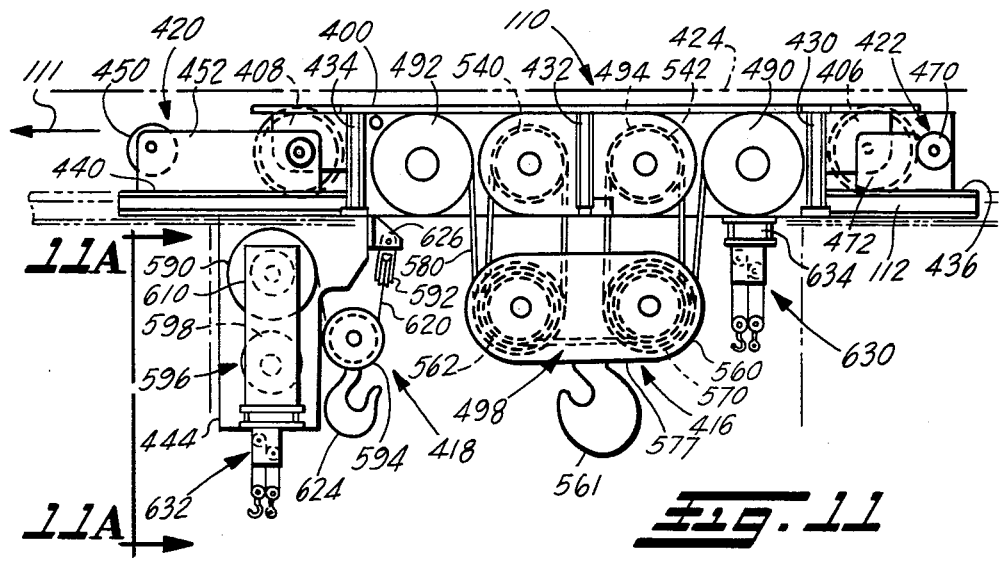
Fig. 11
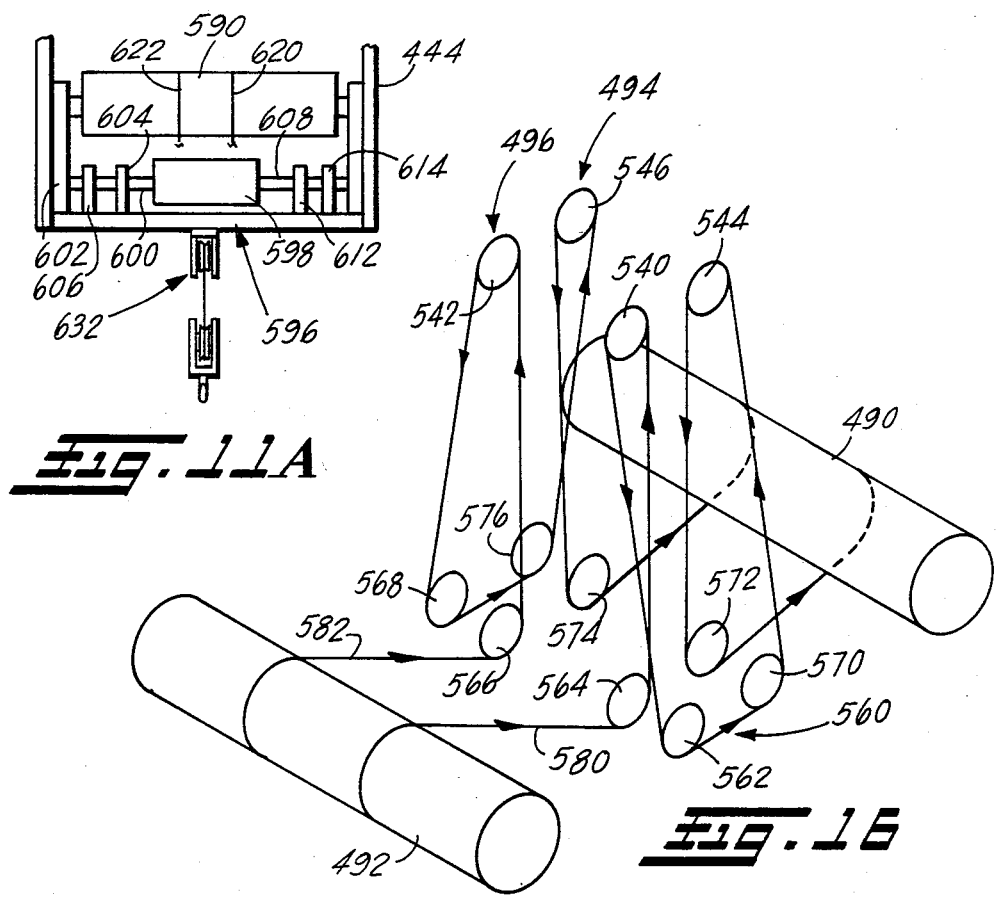
Fig. 11A
Fig. 16

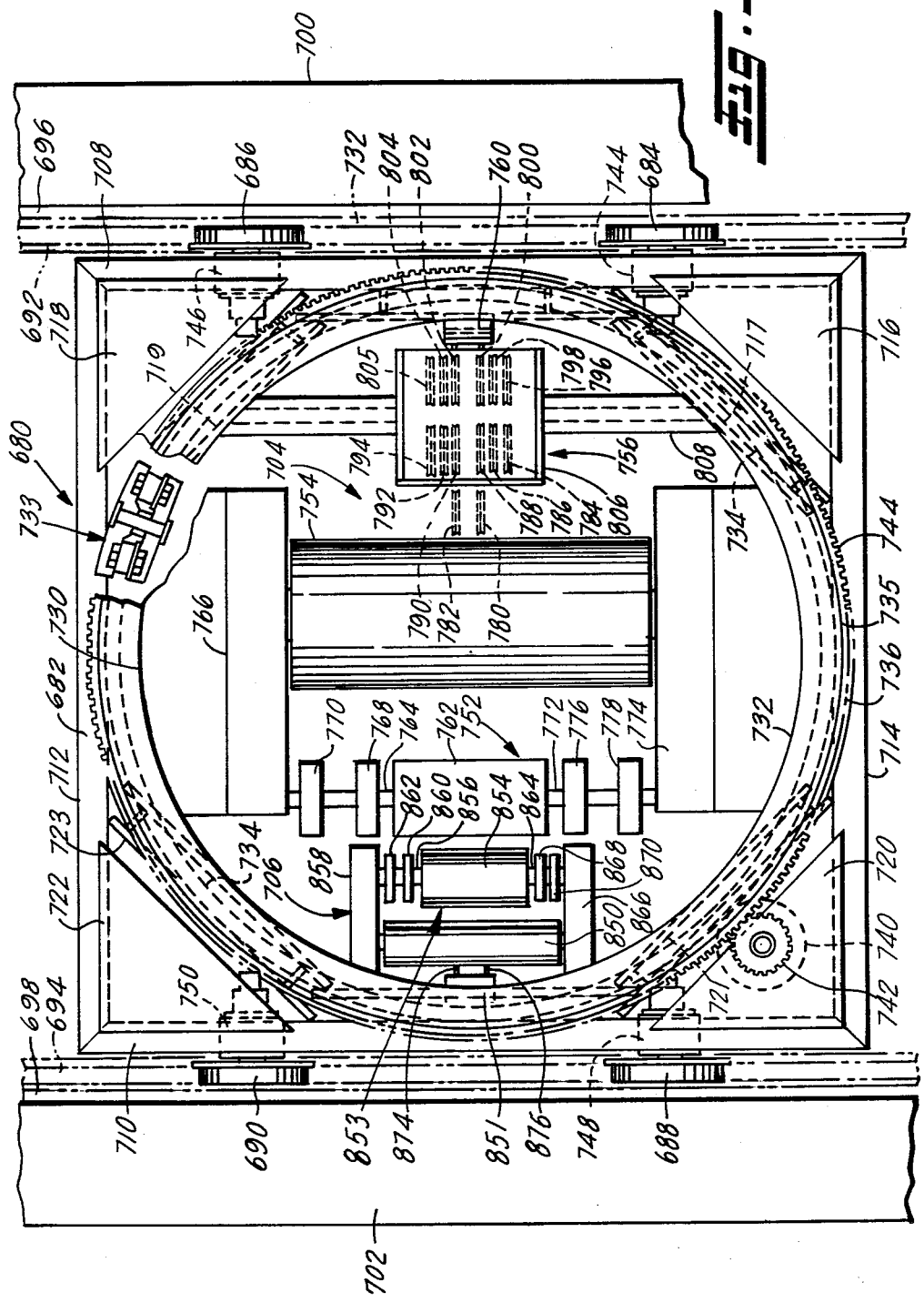

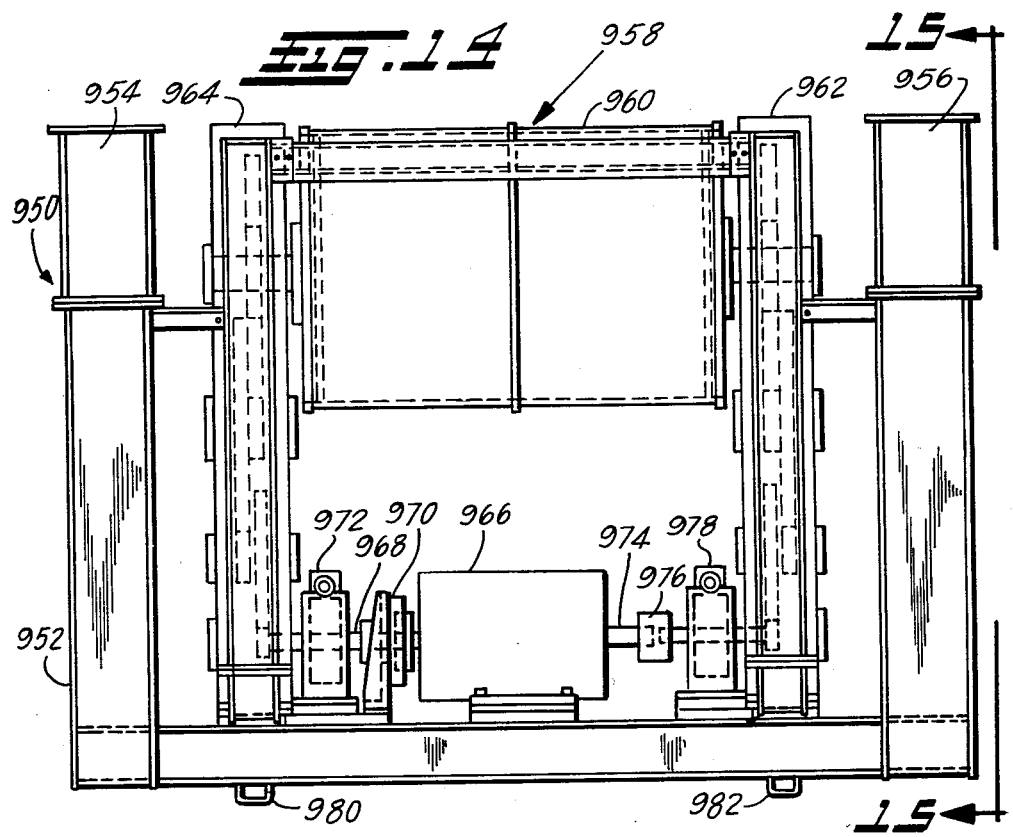
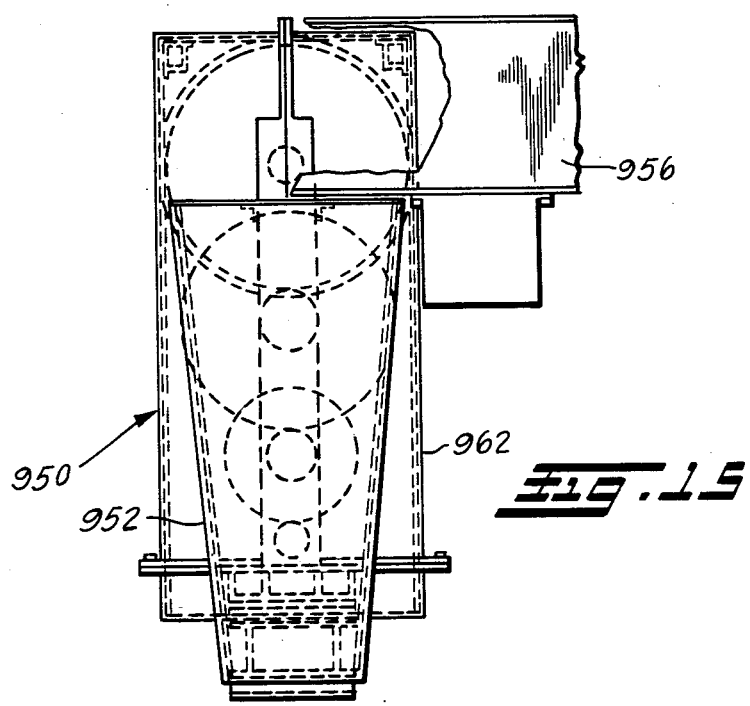

CRANE FOR NUCLEAR WASTE HANDLING FACILITIES

TECHNICAL FIELD

This invention relates to cranes and, more particularly, to cranes adapted for use in nuclear waste handling facilities.

BACKGROUND OF THE INVENTION

Nuclear waste is the by-product of reactors that turn out plutonium and other nuclear materials. The problem of storing nuclear waste has built up over the last three decades and continues to get worse. It has been reported that nuclear waste is increasing at a current rate of about 1.5 million gallons a year and it has been estimated that at the end of 1980, 76.8 million gallons were stored by the Department of Energy. It has also been reported that the Department of Energy is running out of space for new tanks for storing nuclear waste and that some of the older tanks have developed leaks.

Concerted efforts are being made to find safe techniques and facilities for processing and storing such waste. For example, it has been proposed to compress the volume of such waste by combining waste now sitting in tanks in the form of brown sludge with a special form of glass. The glass-like mixture is then sealed in stainless steel cylinders which are stored in permanent underground storage sites. By combining the sludge with glass, the volume of waste is sharply reduced and solidified in a permanent form.

The design and construction of facilities for storing and/or processing nuclear waste requires the solution of numerous problems relating to safety before the construction of such facilities can be deemed to be feasible. For example, the buildings for such facilities must be constructed to withstand earthquakes as well as other seismic disturbances. The area in which the nuclear waste is handled, sometimes referred to as the "hot canyon" area, for all practical purposes cannot be entered by operating personnel. These considerations place severe design limitations on equipment, particularly cranes, which must be used in such facilities.

The requirement that such buildings have seismic integrity places a premium on space and, accordingly, the height and width of overhead cranes for use in such facilities are severely limited. Because the level of radiation for operating personnel is too intense in the hot canyon area to permit entry, such cranes muct be designed to operate by remote control. Multiple levels of redundancy are required in the design of such cranes to insure that in the event of breakdown, the crane can be removed from the hot canyon area.

The on-board crane control mechanisms, e.g., motion control systems, radio control systems, closed circuit television camera control systems, etc., are the most vulnerable parts of the crane with respect to potential breakdown. Such control mechanisms must be shielded from direct exposure to the relatively intense levels of radiation in the hot canyon area to insure reliable performance. Typical low cost barrier materials, such as concrete, add large amounts of weight to the crane in addition to taking up valuable space. It is necessary to store the on-board control mechanisms in a manner so as to limit their exposure to radiation and to permit access to such controls and at the same time not burden the crane with undue weight and lost space.

SUMMARY OF THE INVENTION

The present invention contemplates the provision of a crane for use in a nuclear waste handling facility comprising: a bridge of sufficient transverse dimension to span the width of the area being serviced by said crane; means for moving said bridge along spaced rails extending longitudinally along opposite sides of said area being serviced; and crane control means depending from cantilever means extending from said bridge; said facility including stationary radiation barrier means extending longitudinally in spaced relationship to one of said rails, said barrier means being positioned between said bridge and said crane control means. The invention further contemplates the provision of a crane for operating in a nuclear waste handling facility comprising: a bridge of sufficient transverse dimension to span the width of the area being serviced by said crane, said bridge including at least one horizontally elongated girder with an enclosed interior space having a cross-section of sufficient dimension to permit access to said interior space by operating personnel, said girder including modular radiation barrier means within said interior space; and crane control means positioned within said interior space. In a preferred embodiment, the crane of the invention includes a trolley mounted on said bridge and adapted for horizontal travel along said bridge and hoisting means mounted on said trolley. Advantageously, the bridge drive means of such crane comprises primary, secondary and tertiary drive means each of which is mechanically independent of the other. The bridge and trolley of such crane are constructed in a manner so as to minimize the height of the trolley above the bridge and the width of the bridge.

BRIEF DESCRIPTION OF THE DRAWINGS

In the annexed drawings, like references indicate like parts or features:

FIG. 1 is a fragmentary side elevational view of a nuclear waste handling facility with a crane embodying the present invention in a particular form mounted for use therein;

FIG. 2 is a fragmentary plan view of the facility illustrated in FIG. 1 taken along line 2—2 of FIG. 1;

FIG. 3 is an enlarged fragmentary side elevational view of the crane illustrated in FIG. 1 taken along line 3—3 of FIG. 2;

FIG. 4 is a fragmentary plan view of the crane illustrated in FIG. 1 taken along line 4—4 of FIG. 3;

FIG. 5 is an enlarged side elevational view of the crane illustrated in FIG. 1 taken along line 5—5 of FIG. 4;

FIG. 11 is an enlarged side elevational view of the trolley illustrated in FIG. 4 taken along line 11—11 of FIG. 4;

FIG. 11A is a side elevational view taken along line 11A—11A of FIG. 11;

FIG. 12 is a side elevational view of a trolley in accordance with an alternate embodiment of the present invention, said trolley being suitable for use with the crane illustrated in FIG. 1;

FIG. 13 is an enlarged plan view of the trolley illustrated in FIG. 12 taken along line 13—13 of FIG. 12;

FIG. 14 is a side elevational view of a hoist machinery cradle and hoist machinery mounted thereon in accordance with an alternate embodiment of the present invention;

FIG. 15 is a side elevational view of the machinery and cradle of FIG. 14 taken along line 15—15 of FIG. 14;

FIG. 16 is a schematic illustration of the reeving system employed with the hoist mechanism illustrated in FIGS. 3, 4 and 11.

DESCRIPTION OF THE PREFERRED EMBODIMENT

Figure 3A:
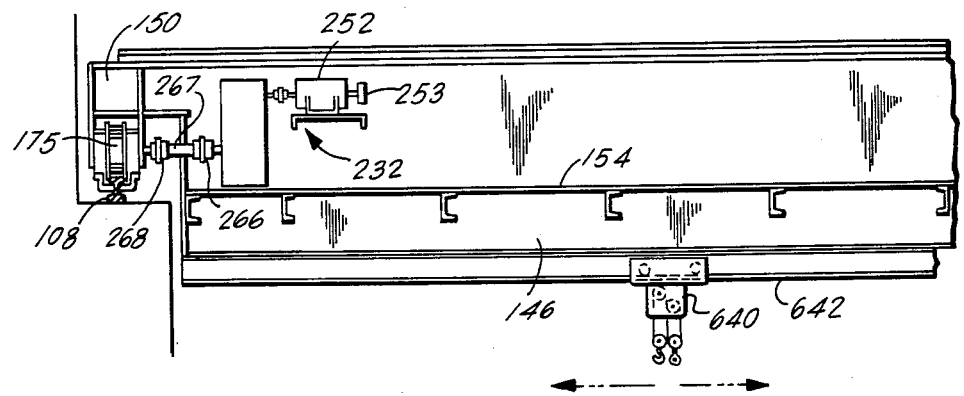
FIG. 3A is a fragmentary side elevational view similar to that of FIG. 3 illustrating an alternate embodiment for the bridge of the crane illustrated in FIG. 1.

Referring to the drawings, and initially to FIGS. 1-4, the crane of the present invention, which in its illustrated embodiment is indicated generally by the reference numeral 100, is mounted for use in a nuclear waste processing facility 102 and comprises: a bridge 104 which is adapted for travel in the directions indicated by arrows 105 and 107 along parallel spaced rails 106 and 108, rails 106 and 108 being mounted on wall portions 131 and 133 of facility 102, respectively, and extending longitudinally along opposite sides of the area of facility 102 being serviced by crane 100; a trolley 110 mounted on bridge 104 and adapted for horizontal travel in the directions indicated by arrows 109 and 111 along parallel spaced rails 112 and 114 which extend transversely, relative to the direction of rails 106 and 108, along the top of bridge 104; and control cabinet 116 which depends from cantilevered beams 118, 120, 122 and 124 which extend from bridge 104, said control cabinet 116 being positioned in conductor bus alleyway 126 of facility 102 which extends longitudinally in spaced relation to rail 106, all as hereinafter further explained.

Nuclear waste handling facility 102 includes a main processing or hot canyon area 130, a crane decontamination area 132 and a crane maintenance area 134. Hot canyon 130 and decontamination area 132 are divided by shielding doors 136. Decontamination area 132 and maintenance area 134 are divided by ventilation barrier 138. Facility 102 is adapted for converting aqueous solutions and/or dispersions containing nuclear waste materials into glass-like mixtures using glass and then sealing the glass-like mixtures in stainless steel cylinders which are transported from facility 102 to designated storage sites. Facility 102 is constructed to withstand seismic disturbances according to standard practice. In operation, hot canyon area 130 has a radiation level of sufficient intensity to prohibit, as a practical matter, operating personnel from entering it. (Theoretically, operators wearing special clothing can have a maximum exposure to the radiation in hot canyon area 130 of no more than about 30 seconds per year when the level or radiation therein is at maximum levels.) Crane 100 is the main process cell crane for facility 102, is designed for transporting major pieces of equipment within hot canyon area 130 and can also be used as a back-up to other material handling systems in hot canyon 130, such other material handling systems not being shown in the drawings.

Bridge 104, which is best illustrated in FIGS. 3 to 5, is a horizontally elongated rectangular frame with horizontally elongated parallel spaced girders 144 and 146 connected by end ties 148 and 150. Girders 144 and 146 are sufficiently elongated to traverse the width of hot canyon area 130. End ties 148 and 150 are shorter than girders 144 and 146, but are sufficiently elongated to provide structural stability to bridge 104 and to provide an open area between girders 144 and 146 to allow for the movement and operation of trolley 110. Girders 144 and 146 and end ties 148 and 150 are preferably made of plate and torsion box construction according to standard practice and formed of high tensile steel to provide maximum strength with a minimum of weight. End ties 148 and 150 are preferably bolted to girders 144 and 146. Bridge 104 also includes walkways 152 and 154 which extend over the length of girders 144 and 146, respectively, to provide for servicing and repair of the bridge and trolley. Walkways 152 and 154 are preferably constructed of stainless steel to provide for line of sight radiation shielding in the event it becomes necessary for operating personnel to use such walkways while bridge 104 is in hot canyon area 130.

Figure 6:
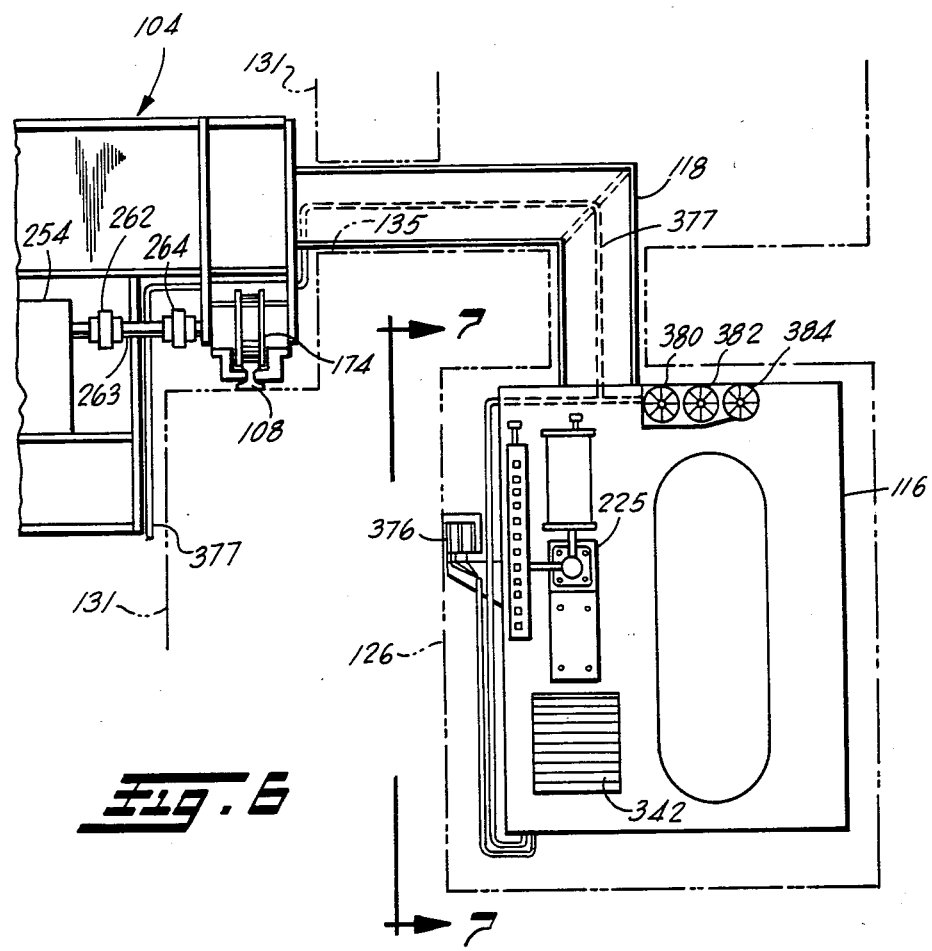
FIG. 6 is an elevational view similar to the view of FIG. 3, but enlarged, illustrating the control booth of the crane illustrated in FIG. 1.
Figure 7:
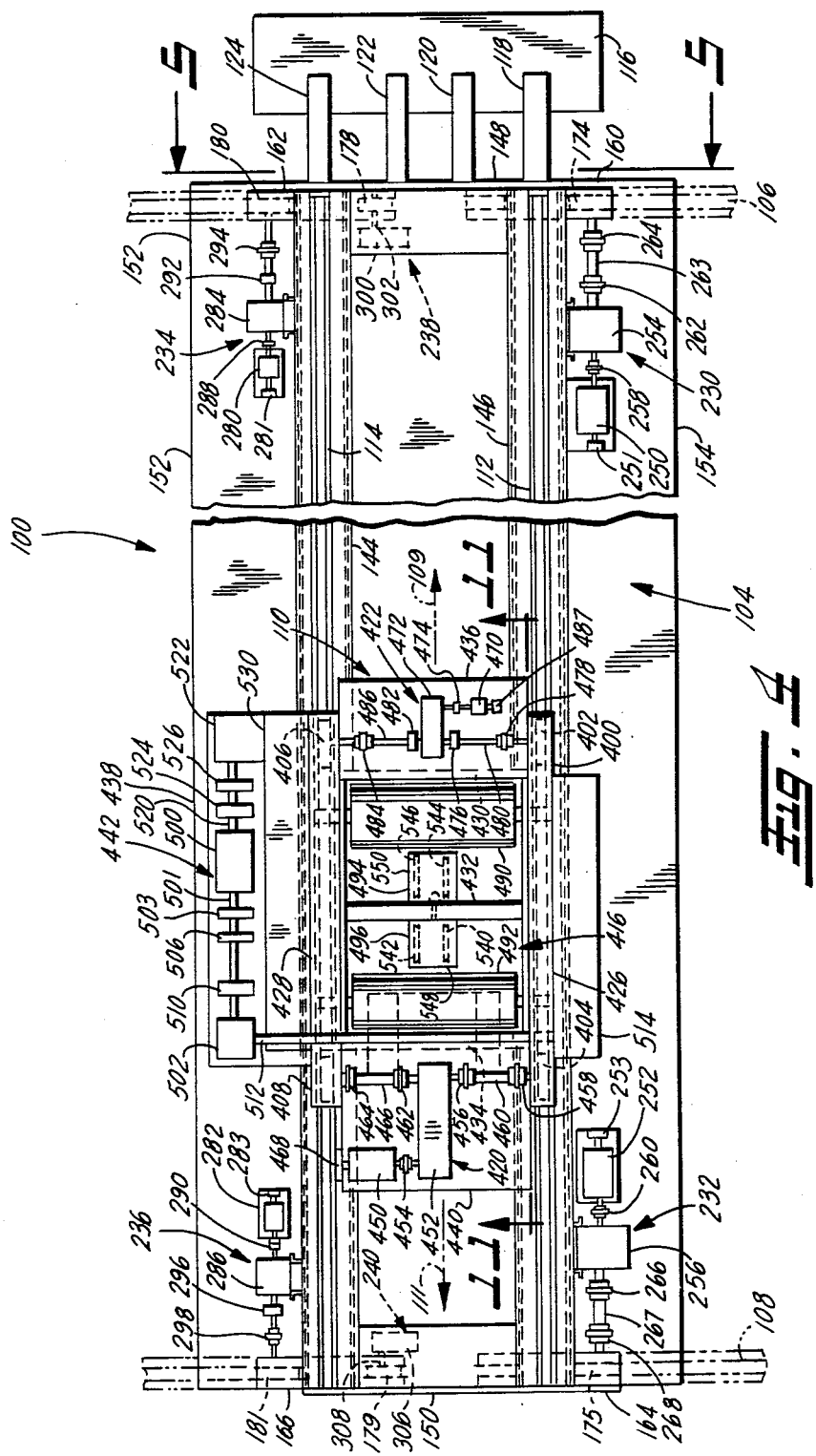
FIG. 7 is a side elevational view of the control booth illustrated in FIG. 6 taken along line 7—7 of FIG. 6.

Bridge 104 is supported by traveling carriages 160, 162, 164 and 166. Carriages 160 and 162 are adapted for travel along rail 106, and carriages 164 and 166 are adapted for travel along rail 108. Carriages 160 and 162 depend from end tie 148, and carriages 164 and 166 depend from end tie 150. Each of the traveling carriages 160, 162, 164 and 166 are identical in design and construction and, accordingly, the following description of carriages 160 and 162, which are best illustrated in FIG. 5, is also applicable to carriages 164 and 166. Carriages 160 and 162 include frame members 170 and 172, main wheels 174 and 176, and 178 and 180, and auxiliary wheels 182 and 184, and 186 and 188, respectively. Main wheels 174, 176, 178 and 180 are double-flanged wheels adapted for travel along rail 106. Auxiliary wheels 182, 184, 186 and 188 are preferably flangeless wheels. Frame member 170 is pivotally attached to end tie frame member 190 by pin 192. Similarly, frame member 172 is pivotally attached to end tie frame member 194 by pin 196. Pins 192 and 196 are positioned to evenly distribute the weight supported by carriages 160 and 162 between wheels 174 and 176, and 178 and 180, respectively. Auxiliary wheels 182 and 184 are positioned inwardly relative to main wheels 174 and 176. Similarly, auxiliary wheels 186 and 188 are positioned inwardly relative to main wheels 178 and 180. Auxiliary wheels 182 and 184, and 186 and 188 depend from hydraulic cylinder assemblies 212 and 214, and 216 and 218, respectively. In normal operation, auxiliary wheels 182 and 184, and 186 and 188 are retained in a suspended mode above rail 106 by spring assemblies 202 and 204, and 206 and 208, respectively. In the event of breakdown of one or more of the main wheels 174, 176, 178 or 180, the load carried by such main wheel can be absorbed by the auxiliary wheel 182, 184, 186 or 188 adjacent such main wheel by lowering such auxiliary wheel into contacting engagement with rail 106. Auxiliary wheel 182, 184, 186 or 188 is lowered by activation of the hydraulic cylinder assembly 212, 214, 216 or 218 associated with such auxiliary wheel. Hydraulic cylinder assemblies 212, 214, 216 and 218 are activated and controlled from hydraulic manifold 225 which is mounted on the exterior of control cabinet 116 (FIGS. 6 and 7). Auxiliary wheels 182, 184, 186 and/or 188 in their extended mode in contact with rail 106 can be used to remove bridge 104 from hot canyon area 130.

Bridge 104 has primary drive mechanisms 230 and 232, secondary drive mechanisms 234 and 236, and tertiary drive mechanisms 238 and 240 for advancing it along rails 106 and 108. Primary drive mechanisms 230 and 232 are synchronized electrically with each other according to standard practice and are mechanically independent of secondary drive mechanisms 234 and 236, and tertiary drive mechanisms 238 and 240. Similarly, secondary drive mechanisms 234 and 236 are synchronized electrically with each other according to standard practice and are mechanically independent of primary drive mechanisms 230 and 232, and tertiary drive mechanisms 238 and 240. Primary drive mechanisms 230 and 232 are adapted for driving wheels 174 and 175 along rails 106 and 108, respectively. Secondary drive mechanisms 234 and 236 are utilized in the event of failure of primary drive mechanisms 230 and/or 232 and are adapted for driving wheels 180 and 181 along rails 106 and 108, respectively. Tertiary drive mechanisms 238 and 240 are utilized in the event of failure of the primary drive mechanisms 230 and 232 and the secondary drive mechanisms 234 and 236 and are adapted for driving wheels 178 and 179 along rails 106 and 108, respectively.

Primary drive mechanisms 230 and 232 are identical in design and construction and include wound rotor motors 250 and 252 which are mounted on girder 146 and rotatably engage gear reducers 254 and 256 to drive wheels 174 and 175, respectively. Gear reducers 254 and 256 are also mounted on girder 146. Motors 250 and 252 are attached to gear reducers 254 and 256 by couplings 258 and 260, respectively. Gear reducer 254 is connected to wheel 174 through couplings 262 and 264 and floating shaft 263. Gear reducer 256 is connected to wheel 175 through couplings 266 and 268 and floating shaft 267. Hydraulic electric shoe brakes 251 and 253 are mounted on motors 250 and 252, respectively, and are adapted to slow or stop the rotation of such motors and thereby provide wheels 174 and 175 with sufficient braking to reduce the speed of bridge 104 as it travels along rails 106 and 108 or to stop bridge 104 at a desired location along rails 106 and 108.

Secondary drive mechanisms 234 and 236 include wound rotor motors 280 and 282 which are mounted on girder 144. Motors 180 and 282 rotatably engage gear reducers 284 and 286, which drive wheels 180 and 181, respectively. Motors 280 and 282 are operatively connected to gear reducers 284 and 286 through couplings 288 and 290, respectively. Gear reducer 284 is connected to wheel 180 through clutch assembly 292 and coupling 294. Gear reducer 286 is connected to wheel 181 through clutch assembly 296 and coupling 298. Hydraulic electric shoe brakes 281 and 283 are mounted on motors 280 and 282, respectively, and are adapted to slow or stop the rotation of such motors and thereby provide wheels 180 and 181, respectively, with sufficient braking to reduce the speed of or stop bridge 104.

Tertiary drive mechanisms 238 and 240 are mounted on end ties 148 and 150, respectively. Drive mechanism 238 is adapted for driving wheel 178 along rail 106, and drive mechanism 240 is adapted for driving wheel 179 along rail 108. Drive mechanism 238 includes hydraulic drive motor 300 which is connected to wheel 178 through coupling 302. Drive mechanism 240 includes hydraulic drive motor 306 which is connected to wheel 179 through coupling 308. Hydraulic drive motors 300 and 306 are activated and controlled from hydraulic manifold 225. In the event of failure of primary drive mechanisms 230 and 232, and secondary drive mechanisms 234 and 236, bridge 104 can be removed from hot canyon area 130 by activation of drive mechanisms 238 and 240. To activate drive mechanisms 238 and 248, the operator can enter conductor bus alleyway 126, wearing special clothing as a precautionary measure to protect him against radiation, attach a portable electric hydraulic drive to hydraulic manifold 225 to operate tertiary drive mechanisms 238 and 240 and in so doing, remove bridge 104 from hot canyon area 130. Alternatively, an electric hydraulic drive adapted for activating drive mechanisms 238 and 240, which can be operated by remote control, can be mounted on control cabinet 116 and remotely operated to remove bridge 104 from hot canyon area 130.

Control cabinet 116 depends from cantilever beams 118, 120, 122 and 124 which extend from end tie 148 and is adapted for movement within conductor bus alleyway 126. Cabinet 116 is adapted for housing all of the on-board controls necessary for operating crane 100. Conductor bus alleyway extends longitudinally along the length of rail 106 in hot canyon area 130 and preferably in decontamination area 132. Concrete wall 131 of facility 102 effectively shields cabinet 116 from line of sight radiation emitted from hot canyon area 130. Wall 131 includes horizontally elongated opening 135 which extends along the length of conductor bus alleyway 126 and permits beams 118, 120, 122 and 124 to extend from end tie 148 through opening 135 to cabinet 116. Conductor bus alleyway 126 is maintained at a positive internal air pressure relative to the air pressure in hot canyon area 130 to prevent particulate radio active matter emitted in hot canyon area 130 from entering conductor bus alleyway 126. The ventilation system for maintaining such positive pressure within conductor bus alleyway 126 is not shown in the drawings but is entirely conventional in design and construction.

Control cabinet 116, which is best illustrated in FIGS. 6 and 7, includes ventilation systems 330 and 332 for control compartment 334 and resistor compartment 336, respectively, to control the temperatures within such compartments. Ventilation system 330 includes motor 338 which drives blower 340. Air is drawn from conductor bus alleyway 126 through filter 342, circulates throughout compartment 334 and is exhausted back into conductor bus alleyway 126 through filter 344. Ventilation system 332 includes motor 350 which drives blower 352. Air is drawn from conductor bus alleyway 126 through filters 354, 356 and 358, circulates throughout compartment 336 and is exhausted back into conductor bus alleyway 126 through filters 360, 362 and 364.

Compartment 334 is adapted for housing the on-board components of close-circuit television camera control system 370, radio control system 372 and motion control system 374. Control system 370 is entirely conventional in design and construction and is adapted for providing power to television monitoring cameras mounted on bridge 104 (not shown in the drawings) and for controlling the operation and movement of such cameras which preferably includes tilt, pan and zoom. Control system 370 is also adapted for amplifying the signal from such television cameras and transferring it to radio control system 372. Radio control system 372 is entirely conventional in design and construction and is adapted for receiving signals from remote primary and/or secondary control consoles or a portable crane control unit, none of which are shown in the drawings but all three of which are entirely conventional in design and construction and are positioned within facility 102, but outside hot canyon area 130. Radio control system 372 is adapted for receiving signals from crane 104 (e.g., motor speed signals, brake activation signals, etc.) and transmitting such signals to the primary and secondary control consoles as well as the portable crane control unit. Radio control system 372 is also adapted for receiving signals from such consoles or control unit (e.g., increase or decrease motor speeds, activate brake mechanisms, etc.) and forwarding such signals to the motion control system 374. Motion control system 374 is also entirely conventional in design and construction and is adapted for transmitting electric current to the appropriate motors, brake mechanisms, etc., from bridge conductor 376 in accordance with instructions received from radio control system 372. Bridge conductor 376, which extends along the length of conductor bus alleyway 126 and transfers electric current to crane 100 through power line 377 in accordance with instructions relayed and processed through cabinet 116, is entirely conventional in design and construction. A festoon of conventional design (not shown in the drawings) is used for the power line feeds to trolley 110. Crane 100 is normally operated remotely from either the primary or secondary crane control console through a microwave radio link. The portable crane control unit is adapted for operating normal crane motions through an ultra-high frequency radio link. Signals are transmitted to and from the primary or secondary crane control console or portable crane control unit through transmitter/receivers 380, 382 and 384. The use of different frequency ranges (i.e., microwave and ultra-high frequency) provides the radio system with redundancy which is necessary in the event of failure of system 372 to receive, process or transmit one of such frequencies. Resistor compartment 336 includes a bank of resistors 337 of conventional design and construction which are connected to the motors used on board crane 100. The use of a separate ventilation system for compartment 336 is particularly advantageous due to the relatively high levels of heat generated by the resistors housed in compartment 336.

Trolley 110, which is best illustrated in FIGS. 3, 4 and 11, includes trolley frame 400 mounted on wheels 402 and 404, and 406 and 408 which are adapted for travel along rails 112 and 114, respectively. Rails 112 and 114 are mounted on the tops of girders 146 and 144, respectively. Trolley frame 400 is sufficiently elongated longitudinally to span the opening between girders 144 and 146 and sufficiently elongated transversely to support main hoist 416, auxiliary hoist 418, main trolley drive 420 and auxiliary trolley drive 422. The height of trolley 110 above rails 112 and 114 is preferably minimized due to cost considerations for constructing facility 102 to withstand earthquakes as well as other seismic disturbances. In this regard, bridge 104 and trolley 110 are preferably constructed to provide a minimal clearance (e.g., three inches) between the top of trolley frame 400 and the ceiling 424 of facility 102. Trolley frame 400 is substantially rectangular and includes parallel spaced side rail members 426 and 428 which are interconnected by parallel spaced cross members 430, 432 and 434. Trolley frame 400 also includes plate members 436, 438 and 440 which are adapted for supporting auxiliary trolley drive 422, drive assembly 442 of main hoist 416, and main trolley drive assembly 420, respectively. Trolley frame 400 also includes auxiliary hoist support frame 444 which depends from side rail members 426 and 428.

Trolley 110 is driven along tracks 112 and 114 by main trolley drive 420. Auxiliary trolley drive 422 is provided for redundancy purposes in the event of failure of main trolley drive 420. Main trolley drive 420 which is mounted on plate member 440 includes electric motor 450 which is attached to gear reducer 452 through coupling 454. Gear reducer 452 is connected to wheel 404 through couplings 456 and 458 which are interconnected by floating shaft 460. Gear reducer 452 is also connected to wheel 408 through coupling 462 and 464 which are interconnected by floating shaft 466. Electrically operated brake mechanism 468 is mounted on motor 450. The rotation of the drive shaft of motor 450 transmits rotational motion to gear reducer 452 which in turn causes shafts 460 and 466 to rotate and drive wheels 404 and 408, respectively. The rotation of the drive shaft of motor 450 in one direction drives trolley 110 in the direction indicated by arrow 109 along rails 112 and 114 and the rotation of the drive shaft of motor 450 in the other direction drives trolley 110 in the direction of arrow 111. The rotation of the drive shaft of motor 450 and, consequently, the rotation of wheels 404 and 408 and the movement of trolley 110 is slowed or stopped by activation of brake mechanism 468. The movement of trolley 110 beyond the edges of bridge 104 is prevented by bumper stops (not shown in the drawings) mounted on end ties 148 and 150 and/or the ends of girders 144 and 146 according to standard practice.

Auxiliary trolly drive 422 includes electric motor 470 which is connected to gear reducer 472 through coupling 474. Gear reducer 472 is attached to wheel 402 through clutch assembly 476 and coupling 478 which are interconnected by floating shaft 480. Gear reducer 472 is connected to wheel 406 through clutch assembly 482 and coupling 484 which are interconnected through floating shaft 486. Electrically operated brake mechanism 487 is mounted on motor 470. In normal operation, trolley 110 is driven by drive assembly 420 and, consequently, clutch assemblies 476 and 482 are used to disengage auxiliary drive 422. In the event of breakdown of main trolley drive 420, clutch assemblies 476 and 482 are used to engage motor 470 with gear reducer 472 to drive wheels 402 and 406. The rotation of the drive shaft of motor 470 in one direction drives trolley 110 in the direction indicated by arrow 109, and the rotation of the drive shaft of motor 470 in the other direction drives trolley 110 in the direction indicated by arrow 111. The movement of trolley 110 is slowed or stopped by the activation of brake mechanism 487.

Main hoist assembly 416 includes main hoist drive assembly 442, lifting drums 490 and 492, upper sheave assemblies 494 and 496 and load block assembly 498. Lifting drums 490 and 492 are rotatably mounted on side rail members 426 and 428. The center axes of lifting drums 490 and 492 are parallel to each other and in spaced relationship to each other. Drive assembly 442 includes electric motor 500 which is mounted on frame member 438. Extending in one direction from motor 500 is line shaft 501 which interconnects right angle gear mechanism 502 with motor 500. Electrically operated brake mechanism 503 is positioned adjacent motor 500 and interconnected with motor 500 by line shaft 501. Clutch assembly 506 is positioned adjacent brake mechanism 503 and interconnected through brake mechanism 503 to motor 500 by line shaft 501. Electrically operated brake mechanism 510 is positioned between clutch assembly 506 and gear 502 and is interconnected through clutch assembly 506 and brake mechanism 503 with motor 500 by line shaft 501. Line shaft 512 extends from right angle gear mechanism 502 at a right angle to line shaft 501 and to main hoist gear reducer 514. Main hoist gear reducer 514 is connected to lifting drum 490. Line shaft 520 extends from motor 500 in the opposite direction of line shaft 501. Line shafts 501 and 520 have a common axis of rotation. Line shaft 520 connects electric motor to right angle gear mechanism 522. Clutch assembly 524 is positioned adjacent motor 500 and is connected to motor 500 by line shaft 520. Electrically operated brake mechanism 526 is positioned between clutch assembly 524 and right angle gear mechanism 522 and is interconnected through clutch assembly 524 with motor 500 by line shaft 520. Gear mechanism 522 is connected to main hoist gear reducer 530 which is connected to lifting drum 492. The rotation of the drive shaft of motor 500 in one direction imparts rotational motion to gear reducers 514 and 530 which in turn causes lifting drums 490 and 492 to rotate. The rotational movement of the drive shaft of motor 500 in one direction results in a coiling movement by drums 490 and 492 with respect to the ropes coiled on such drums, and the rotation of the drive shaft of motor 500 in the opposite direction results in an uncoiling movement by lifting drums 490 and 492. When lifting drum 490 rotates in a clockwise direction, lifting drum 492 rotates in a counter-clockwise direction, and vice versa. The rotational movement of lifting drums 490 and 492 can be slowed or stopped by brake mechanism 503. Brake mechanisms 510 and 526 are provided for purposes of redundancy, such brake mechanisms can be used to lock lifting drums 490 and 492, respectively, in place in the event of failure of motor 500, brake mechanism 503, clutch assemblies 506 or 524, and/or line shafts 501 or 520.

Upper sheave assembly 496 includes upper sheave wheels 540 and 542 which are rotatably mounted on support bracket 548 which is mounted on and extends horizontally from the side of cross member 432. Similarly, upper sheave assembly 494 includes upper sheave wheels 544 and 546 which are rotatably mounted on support bracket 550 which is mounted on and extends horizontally from the other side of cross member 432. Support bracket 550 is pivotally mounted on member 432 to provide for equalization of the loads on ropes 580 and 582. Upper sheave wheels 540 and 542 are coaxial with each other. Similarly, upper sheave wheels 544 and 546 are coaxial with each other. The center axes of upper sheave wheels 540 and 542, and 544 and 546 are coplanar with each other and parallel to each other.

Load block assembly 498 includes load block sheave assembly 560 and load block hook 561. Load block sheave assembly 498 includes an array of eight coplanar load block sheave wheels (FIG. 16) 562, 564, 566, 568, 570, 572, 574 and 576 rotatably mounted on load block frame member 577 and arranged in four load block sheave wheel sets. Load block sheave wheels 562, 564, 566 and 568 are coaxial with each other. Similarly, load block sheave wheels 570, 572, 574 and 576 are coaxial with each other. The center axis of load block sheave wheels 562, 564, 566 and 568 is parallel to and spaced from the center axis of load block sheave wheels 570, 572, 574 and 576.

Load block assembly 498 is suspended by ropes 580 and 582 which are coiled and uncoiled on lifting drums 490 and 492, and are reeved through upper sheave assemblies 494 and 496 and through load block sheave assembly 560. Lifting drum 492 has a set of right-handed grooves extending over half of its surface adapted for coiling and uncoiling rope 580, and a set of left-handed grooves extending over the other half of its surface adapted for coiling and uncoiling rope 582. Lifting drum 490 has a set of left-handed grooves extending over half of its surface for coiling and uncoiling rope 580, and a set of right-handed grooves extending over the other half of its surfaces adapted for coiling and uncoiling rope 582.

The reeving of ropes 580 and 582 is best illustrated in FIG. 16. Rope 580, which is coiled and uncoiled in the right-handed grooves of lifting drum 490, drops from lifting drum 492 to load block sheave wheel 564, wraps around part of sheave wheel 564, extends upwardly to upper sheave wheel 540, wraps around part of sheave wheel 540, drops to load block sheave wheel 562, wraps around part of sheave wheel 562, extends under sheave wheel 562 to load block sheave wheel 570, wraps around the underside of sheave wheel 570, extends upwardly to upper sheave wheel 544, wraps around part of sheave wheel 544, drops to load block sheave wheel 572, wraps around part of sheave wheel 572 and extends upwardly to lifting drum 490 where it is coiled and uncoiled in the left-handed grooves of lifting drum 490. Rope 582, which is coiled and uncoiled in the left-handed grooves of lifting drum 492, drops from lifting drum 492 to load block sheave wheel 566, wraps around part of sheave wheel 566, extends upwardly to upper sheave wheel 542, wraps around part of sheave wheel 542, drops to load block sheave wheel 568, wraps around part of sheave wheel 568, extends under sheave wheel 568 to load block sheave wheel 576, wraps around the underside of sheave wheel 576, extends upwardly to upper sheave wheel 546, wraps around part of sheave wheel 546, drops to load block sheave wheel 574, wraps around part of sheave wheel 574, and extends upwardly to lifting drum 490 where it is coiled and uncoiled in the right-handed grooves of lifting drum 490. An advantage of the foregoing reeving system is that no cross-over reeving is used which permits load block assembly 498 to be hoisted upwardly to a maximum level adjacent the underside of upper sheave assembly 496 without effecting undue stress in ropes 580 and 582. A rope cutter of conventional design (not shown in the drawings) is mounted on cross member 432 and is adapted for cutting ropes 580 and 582 in the event it becomes necessary to drop the load being hoisted by main hoist 416 in order to remove crane 100 from hot canyon area 130.

Auxiliary hoist 418 includes auxiliary lifting drum 590, auxiliary equalizer assembly 592 and auxiliary hook block assembly 594. Auxiliary lifting drum 590 is rotated by auxiliary drive assembly 596 which includes electric motor 598 and is mounted on support frame 444. Extending in one direction from motor 598 is line shaft 600 which connects gear reducer 602 with motor 598. Clutch assembly 604 is positioned adjacent motor 598 and is interconnected with motor 598 by line shaft 600. Electrically operated brake mechanism 606 is positioned between clutch assembly 604 and gear reducer 602 and is interconnected with motor 598 through clutch assembly 604 by line shaft 600. Gear reducer 602 is connected to auxiliary lifting drum 590. Extending in the opposite direction from motor 598 is line shaft 608 which interconnects gear reducer 610 with motor 598. Clutch assembly 612 is positioned adjacent motor 598 and interconnected with motor 598 through line shaft 608. Electrically operated brake mechanism 614 is positioned between clutch assembly 612 and gear reducer 610 and is interconnected with motor 598 through clutch assembly 612 by line shaft 608. Gear reducer 610 is connected to auxiliary lifting drum 590. The rotation of the drive shaft of motor 598 in one direction imparts rotational motion to gear reducers 602 and 610 resulting in the rotation of auxiliary lifting drum 590 in one direction. The rotation of the drive shaft of the motor 598 in the opposite direction imparts rotational motion to gear reducers 602 and 610 in the opposite direction which in turn causes auxiliary lifting drum 590 to rotate in the opposite direction.

Auxiliary lifting drum 590 has a set of right-handed grooves covering half of its surface for coiling and uncoiling rope 620. Auxiliary lifting drum 590 also has a set of left-handed grooves on the other half of its surface for coiling and uncoiling rope 622. Auxiliary hook block assembly 594 includes a pair of coaxial sheave wheels and auxiliary hook 624. Equalizer assembly 592 pivotally depends from bracket portion 626 of frame 444 and includes a load cell of conventional design for sensing the load being hoisted by auxiliary hoist 418. Rope 620, which is coiled and uncoiled in the right-handed grooves of drum 590, drops from drum 590 to one of the sheave wheels of hook block assembly 594, wraps around said sheave wheel, and extends upwardly to equalizer 592 where it is attached. Rope 622, which is coiled and uncoiled in the left-handed grooves of drum 590, drops from drum 590 to the other of the sheave wheels of hook block assembly 594, wraps around said other sheave wheel, and extends upwardly to equalizer 592 where it is attached. A rope cutter of conventional design (not shown in the drawings) depends from frame 444 and is adapted for cutting ropes 620 and 622 in the event it becomes necessary to drop the load being hoisted by auxiliary hoist 418 in order to remove crane 100 from hot canyon area 130.

Supplemental hoists 630 and 632 depend from the underside of trolley frame 400 and are adapted for hoisting relatively small loads in comparison to the loads for which the main hoist 416 and auxiliary hoist 418 are designed. Each of the hoists 630 and 632 have two hooks each of which is suspended by a rope, and a motor for raising and lowering such hooks. Hoists 630 and 632 are centered under trolley frame 400. Hoist 630 is dependent from girder 634 which depends from and extends between trolley side rails 426 and 428. Hoist 632 depends from support frame 444. Hoists 630 and 632 are entirely conventional in design and construction and, accordingly, need not be further described herein.

In an alternative embodiment of the invention, which is illustrated in FIG. 3A, monorail supplemental hoists depend from monorails mounted on the undersides of girders 144 and 146. In the embodiment illustrated in FIG. 3A, monorail supplemental hoist 640 is mounted on and adapted for travel along monorail 642. Monorail 642 depends from the underside of girder 146 and extends along the length of girder 146. Hoist 640 includes a motor for driving it along monorail 642 and a motor for raising and lowering the two hooks suspended by it. Hoist 640 is entirely conventional in design and construction and, accordingly, need not be further described herein. In the embodiment illustrated in FIG. 3A, a second monorail supplemental hoist (not shown in the drawings) depends from a second monorail which is mounted on the underside of girder 144. These monorail supplemental hoists are adapted for hoisting and transporting relatively small loads in comparison to the loads for which main hoist 416 and auxiliary hoist 418 are designed.

In another alternative embodiment of the present invention, trolley 680 is employed in lieu of trolley 110. Trolley 680, which is illustrated in FIGS. 12 and 13, includes trolley frame 682 mounted on wheels 684 and 686, and 688 and 690 which are adapted for travel along rails 692 and 694, respectively. Rails 692 and 694 are mounted on cantilevered support members 696 and 698 which extend from the inner sides of bridge girders 700 and 702, respectively. With the exception of the mounting of rails 692 and 694 on cantilevered support members 696 and 698 of bridge girders 700 and 702, the bridge adapted for use with trolley 680 is, in all other respects, identical to bridge 104. It will be understood by those skilled in the art that trolley 680 can be mounted on rails 112 and 114 of bridge girders 146 and 144, respectively. However, in view of the desirability of limiting the vertical extent of the trolley and bridge of the present invention, and in view of the fact that trolley 680 has a greater vertical extent than trolley 110, it is preferable to mount trolley 680 on rails positioned below the top of the bridge girders than on rails extending along the top of the bridge girders.

Trolley frame 682 is sufficiently elongated longitudinally to span the opening between bridge girders 700 and 702 and sufficiently elongated transversely to support main hoist assembly 704 and auxiliary hoist assembly 706. The vertical extent of trolley 680 above rails 692 and 694, although greater than the vertical extent of trolley 110, is preferably minimized due to cost considerations for constructing facility 102 to withstand earthquakes as well as other seismic disturbances. Trolley frame 680 is substantially rectangular and includes parallel spaced side rails 708 and 710 which are interconnected by parallel spaced cross members 712 and 714. Trolley frame 682 also includes corner plate members 716, 718, 720 and 722 and corner support members 717, 719, 721 and 723. Trolley 680 includes rotatable hoist support frame 730 which is supported by rails 708 and 710, cross members 712 and 714, and corner support members 717, 719, 721 and 723 on rotate bearing 732. Rotate bearing 732 includes fixed bearing ring 734 bolted to rails 708 and 710, cross members 712 and 714 and support members 717, 719, 721 and 723, and rotate bearing ring 735 bolted to frame 730, and adapted for riding on rollers 733 which are supported by and ride on fixed ring 734. Rollers 733 are distributed throughout ring 734. Rotate bearing ring 735 includes slewing ring 736 bolted to its exterior. Slewing ring 736 includes teeth 744. Hydraulic rotate motor 740 is mounted on the underside of plate member 720 and supports and rotates pinion gear 742 which is mounted on a vertical shaft extending from motor 740 above plate member 720. Pinion gear 742 engages the teeth 744 of slewing ring 736. The rotation of motor 740 provides for the rotation of frame 730, 180° in either clockwise or counter-clockwise direction.

Trolley 680 is driven along tracks 692 and 694 by hydraulic drive motors 744 and 746 which are mounted on side rail frame member 708 and are adapted for driving wheels 684 and 686, respectively. Hydraulic drive motors 748 and 750 are mounted on side rail frame member 710 and are adapted for driving wheels 688 and 690, respectively. Drive motors 746 and 750 are electrically synchronized with each other according to standard practice. Drive motors 744 and 748 are electrically synchronized with each other according to standard practice and are slave to drive motors 746 and 750.

Main hoist assembly 704 includes main hoist drive assembly 752, lifting drum 754, upper sheave assembly 756, load block assembly 758 and equalizer assembly 760. Drive assembly 752, which includes electric motor 762, is mounted on frame 730. Extending in one direction from motor 762 is line shaft 764 which interconnects gear reducer 766 with motor 762. Clutch assembly 768 is positioned adjacent motor 762 and interconnected with motor 762 by line shaft 764. Electrically operated brake mechanism 770 is positioned between clutch assembly 768 and gear reducer 766 and is interconnected through clutch assembly 768 with motor 752 by line shaft 764. Gear reducer is connected to and supports one end of lifting drum 754. Line shaft 772 extends from motor 762 in the opposite direction of line shaft 764. Line shafts 764 and 772 have a common axis of rotation. Line shaft 772 interconnects electric motor 752 with gear reducer 774. Clutch assembly 776 is positioned adjacent motor 762 and is connected to motor 762 by line shaft 772. Electrically operated brake mechanism 778 is positioned between clutch assembly 776 and gear reducer 774 and is interconnected through clutch assembly 776 with motor 762 by line shaft 772. Gear reducer 774 is attached to and supports the other end of lifting drum 754. Gear reducers 766 andf 774 are mounted on frame 730. The rotation of the drive shaft of motor 762 imparts rotational motion to gear reducers 766 and 774 which in turn causes lifting drum 754 to rotate. Rotation of the drive shaft of motor 762 in one direction results in a clockwise movement of lifting drum 754, and rotation of the drive shaft of motor 762 in the opposite direction results in a counter-clockwise rotation of lifting drum 754. The rotational movement of lifting drum 754 can be slowed or stopped by brake mechanisms 770 and 778. Brake mechanisms 770 and 778 can also be used to lock lifting drum 754 in place in the event of failure of motor 762, clutch assemblies 768 or 776 and/or line shafts 764 or 772.

Upper sheave assembly 756 includes a pair of coaxial lead sheaves 780 and 782, and an array of 12 coplanar upper sheave wheels 784, 786, 788, 790, 792, 794, 796, 798, 800, 802, 804 and 805 rotatably mounted in upper sheave frame member 806. Frame member 806 is supported by cross member 808 which is mounted on frame 730. Upper sheave wheels 784, 786, 788, 790, 792 and 794 are coaxial with each other. Similarly, upper sheave wheels 796, 798, 800, 802, 804 and 805 are coaxial with each other. The center axis of upper sheave wheels 784, 786, 788, 790, 792 and 794 is parallel to and spaced from the center axis of upper sheave wheels 796, 798, 800, 802, 804 and 805.

Load block assembly 758 includes load block sheave assembly 810 and load block hook 812. Load block sheave assembly 810 includes an array of 16 coplanar load block sheave wheels (FIG. 17) 814, 816, 818, 820, 822, 824, 826, 828, 830, 832, 834, 836, 838, 840, 842 and 844. Load block sheave wheels 814, 816, 818, 820, 822, 824, 826 and 828 are coaxial with each other. Similarly, load block sheave wheels 830, 832, 834, 836, 838, 840, 842 and 844 are coaxial with each other. The center axis of load block sheave wheels 814, 816, 818, 820, 822, 824, 826 and 828 is parallel to and spaced from the center axis of load block sheave wheels 830, 832, 834, 836, 838, 840, 842 and 844.

Load block assembly 758 is suspended by ropes 850 and 852 which are coiled and uncoiled on lifting drum 754, and are reeved through upper sheave assembly 756, load block sheave assembly 810 and attached to equalizer assembly 760. Lifting drum 754 has a set of right-handed grooves extending over half of its surface adapted for coiling and uncoiling rope 850, and a set of left-handed grooves extending over the other half of its surface adapted for coiling and uncoiling rope 852.

Figure 17:
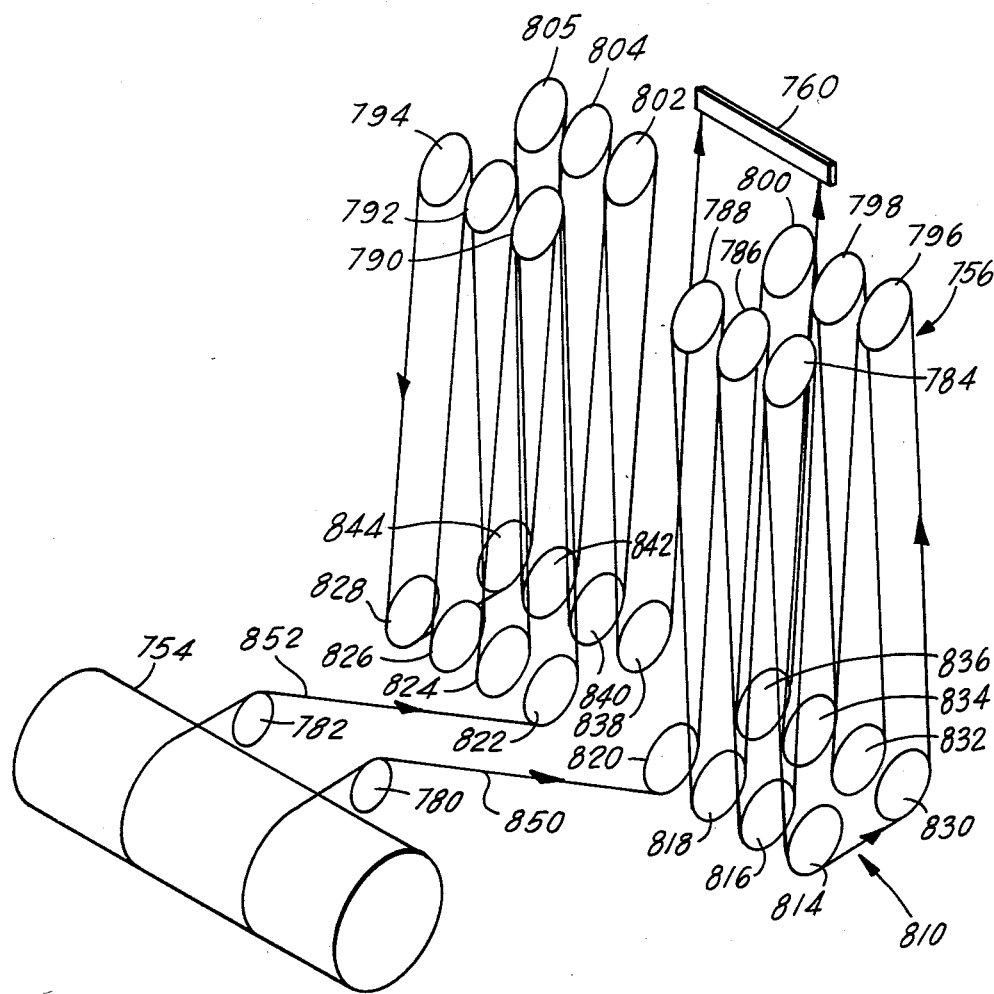
FIG. 17 is a schematic illustration of the reeving system employed with the hoist mechanism illustrated in FIGS. 12 and 13.

The reeving of ropes 850 and 852 is best illustrated in FIG. 17. Rope 850, which is coiled and uncoiled in the right-handed grooves of lifting drum 754, extends to lead sheave wheel 780, wraps around part of sheave wheel 780, drops to load block sheave wheel 820, wraps around part of sheave wheel 820, extends upwardly to upper sheave wheel 788, wraps around part of sheave wheel 788, drops to load block sheave wheel 818, wraps around part of sheave wheel 818, extends upwardly to upper sheave wheel 786, wraps around part of sheave wheel 786, drops to load block sheave wheel 816, wraps around part of sheave wheel 816, extends upwardly to upper sheave wheel 784, wraps around part of sheave wheel 784, drops to load block sheave wheel 814, wraps around part of sheave wheel 814, extends under sheave wheel 814 to load block sheave wheel 830, wraps around the underside of sheave wheel 830, extends upwardly to upper sheave wheel 796, wraps around part of sheave wheel 796, drops to load block sheave wheel 832, wraps around part of sheave wheel 832, extends upwardly to upper sheave wheel 798, wraps around part of sheave wheel 798, drops to load block sheave wheel 834, wraps around part of sheave wheel 834, extends upwardly to upper sheave wheel 800, wraps around part of sheave wheel 800, drops to load block sheave wheel 836, wraps around part of load block sheave wheel 836 and extends upwardly to equalizer assembly 760 where it is attached. Rope 852, which is coiled and uncoiled in the left-handed grooves of lifting drum 754, extends to lead sheave wheel 782, wraps around part of sheave wheel 782, drops to load block sheave wheel 822, wraps around part of sheave wheel 822, extends upwardly to upper sheave wheel 790, wraps around part of sheave wheel 790, drops to load block sheave wheel 824, wraps around part of sheave wheel 824, extends upwardly to upper sheave wheel 792, wraps around part of sheave wheel 792, drops to load block sheave wheel 826, wraps around part of sheave wheel 826, extends upwardly to upper sheave wheel 794, wraps around part of sheave wheel 794, drops to load block sheave wheel 828, wraps around part of sheave wheel 828, extends under sheave wheel 828 to load block sheave wheel 844, wraps around the underside of sheave wheel 844, extends upwardly to upper sheave wheel 805, wraps around part of sheave wheel 805, drops to load block sheave wheel 842, wraps around part of sheave wheel 842, extends upwardly to upper sheave wheel 804, wraps around part of sheave wheel 804, drops to load block sheave wheel 840, wraps around part of sheave wheel 840, extends upwardly to upper sheave wheel 802, wraps around part of sheave wheel 802, drops to load block sheave wheel 838, wraps around part of sheave wheel 838 and extends upwardly to equalizer assembly 760 where it is attached. An advantage of the foregoing reeving system is that no cross-over reeving is used which permits load block assembly 758 to be hoisted to a maximum level adjacent the underside of upper sheave assembly 756 without effecting undue stress in ropes 850 and 852. A rope cutter of conventional design (not shown in the drawings) is mounted adjacent sheaves 780 and 782 and is adapted for cutting ropes 850 and 852 in the event it becomes necessary to drop the load being hoisted by main hoist 704 to remove the crane from hot canyon area 130.

Auxiliary hoist 706 includes auxiliary lifting drum 850, auxiliary equalizer assembly 851 and auxiliary hook block assembly 852. Auxiliary lifting drum 850 is rotated by auxiliary drive assembly 853 which is mounted on support frame 854 which depends from frame 730. Drive assembly 853 includes electric motor 854. Extending in one direction from motor 854 is line shaft 856 which interconnects gear reducer 858 with motor 854. Clutch assembly 860 is positioned adjacent motor 854 and is connected to motor 854 by line shaft 856. Electrically operated brake mechanism 862 is positioned between clutch assembly 860 and gear reducer 858 and is interconnected with motor 854 through clutch assembly 860 by line shaft 856. Gear reducer 858 is connected to auxiliary lifting drum 850. Extending in the opposite direction from motor 854 is line shaft 864 which connects gear reducer 866 to motor 854. Clutch assembly 868 is positioned adjacent motor 854 and connected to motor 854 through line shaft 864. Electrically operated brake mechanism 870 is positioned between clutch assembly 864 and gear reducer 866 and is interconnected with motor 854 through clutch assembly 868 by line shaft 864. Gear reducer 866 is connected to auxiliary drum 850. The rotation of the drive shaft of motor 854 in one direction imparts rotational motion to gear reducers 858 and 866 resulting in clockwise rotation of auxiliary lifting drum 850. The rotation of the drive shaft of motor 854 in the opposite direction imparts rotational motion to gear reducers 858 and 866 resulting in counter-clockwise rotation of auxiliary lifting drum 850.

Auxiliary lifting drum 850 has a set of right-handed grooves covering half of its surface for coiling and uncoiling rope 874. Auxiliary lifting drum also has a set of left-handed grooves covering the other half of its surface for coiling and uncoiling rope 876. Auxiliary hook block assembly 852 includes a pair of coaxial sheave wheels and auxiliary hook 878. Equalizer assembly 851 pivotally depends from bracket 880 which in turn depends from frame 730. Equalizer assembly 851 includes a load cell of conventional design for sensing the load being hoisted by auxiliary hoist 706. Rope 874, which is coiled and uncoiled in the right-handed grooves of drum 850, drops from drum 850 to one of the sheave wheels of hook block assembly 852, wraps around said sheave wheel, and extends upwardly to equalizer 851 where it is attached. Rope 876, which is coiled and uncoiled in the left-handed grooves of drum 850, drops from drum 850 to the other of the sheave wheels hook block assembly 852, wraps around said other sheave wheels, and extends upwardly to equalizer 851 where it is attached. A rope cutter of conventional design (not shown in the drawings) depends from bracket 880 and is adapted for cutting ropes 874 and 876 in the event it becomes necessary to drop the load being hoisted by auxiliary hoist 706 in order to remove the crane from hot canyon area 130.

Supplemental hoists 886 and 888 depend from the underside of trolley 680 and are adapted for hoisting relatively small loads in comparison to the loads for which main hoist 704 and auxiliary hoist 706 are designed. Hoists 886 and 888 are preferably bolted to frame member 890 which depends from frame 730. Hoists 886 and 888 are identical in design and construction to hoists 630 and 632.

Figure 8:
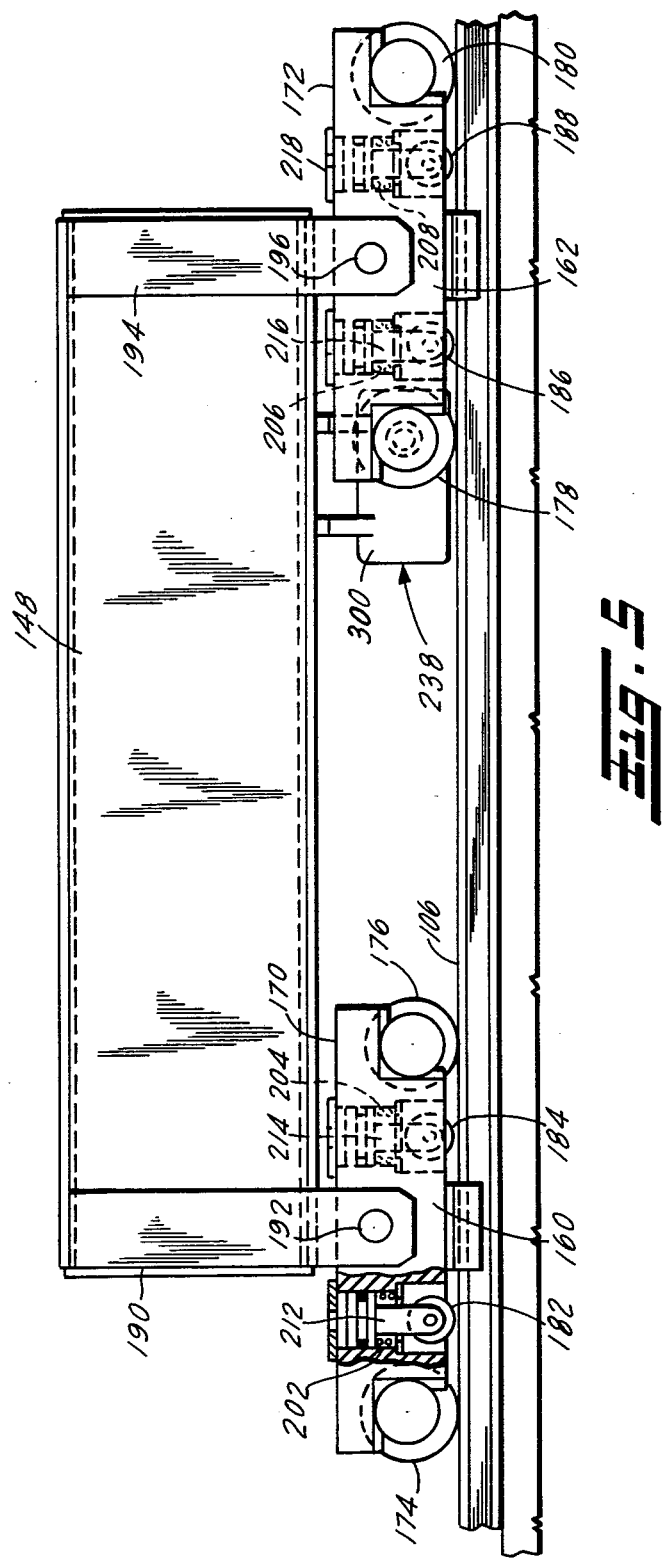
FIG. 8 is a top plan view of an enlarged girder suitable for housing crane control apparatus for use with an alternate embodiment of the crane of the present invention.
Figure 9:
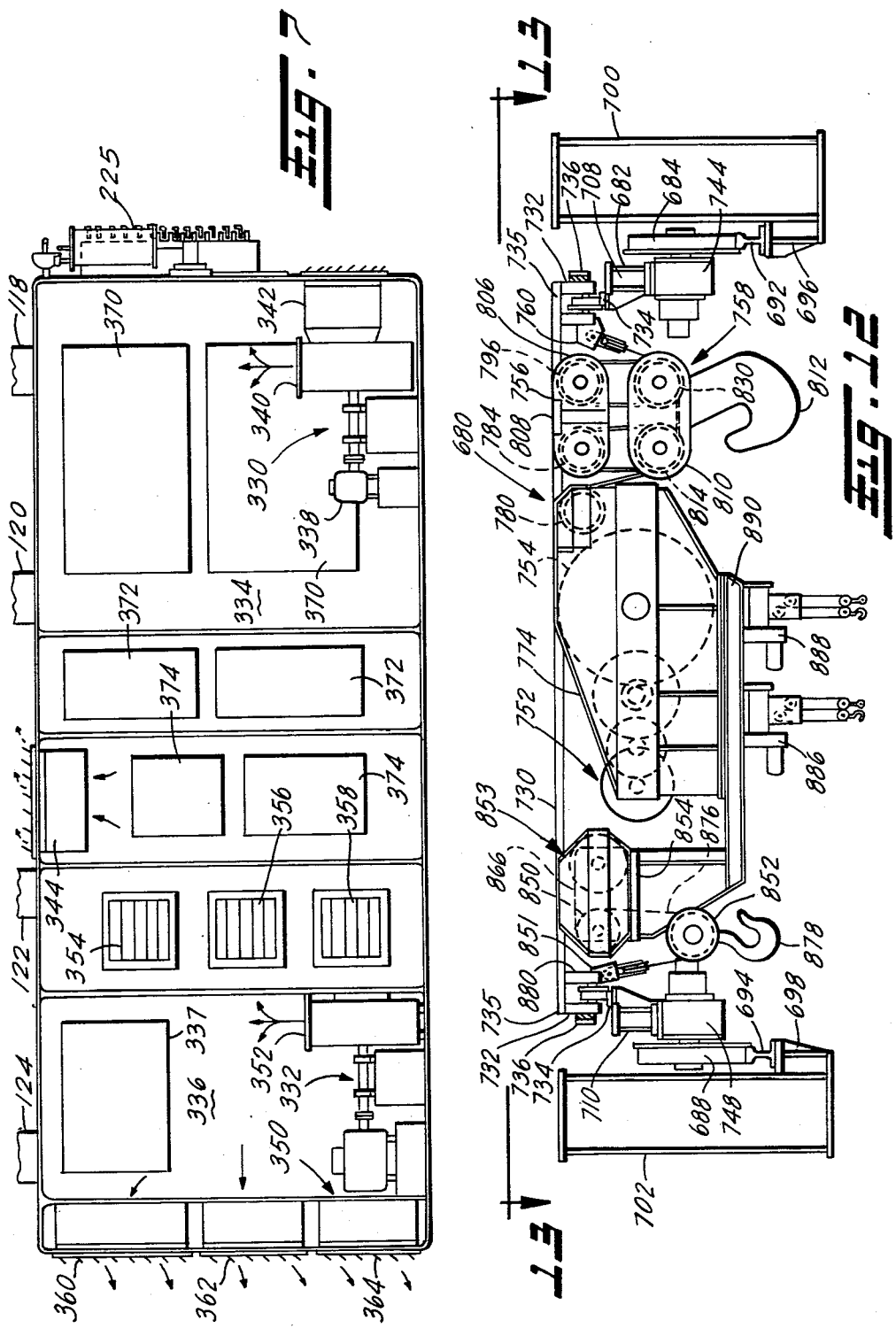
FIG. 9 is a side elevational view of the girder of FIG. 8 taken along line 9—9 of FIG. 8.
Figure 10:
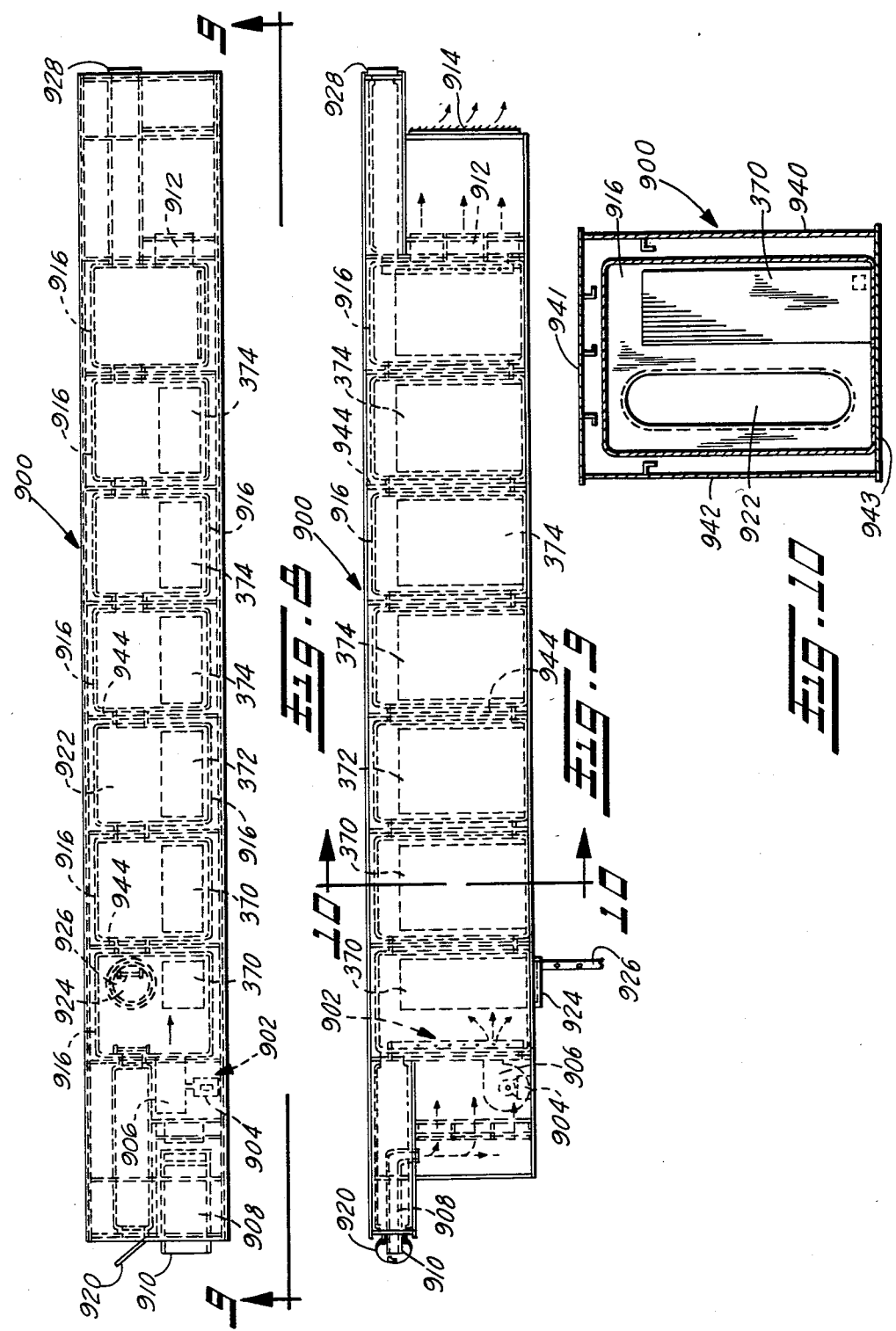
FIG. 10 is a cross-sectional view of the girder of FIG. 8 taken along line 10—10 of FIG. 9.

In another alternative embodiment of the present invention, girder 900, which is illustrated in FIGS. 8–10, is employed with bridge 104 in lieu of one of the bridge girders 144 or 146. In this embodiment, control cabinet 116 is not employed and consequently cantilever beams 118, 120, 122 and 124 are also not required. Girder 900 supports one of the trolley rails for supporting either trolley 110 or trolley 680. The trolley rail supported by girder 900 can be mounted on top of girder 900, as in the case with girders 144 and 146, or it can be mounted on the inner side of girder 900 as in the case with rails 692 and 694 supported by cantilevered members 696 and 698 of bridge girders 700 and 702, respectively. In the latter case, a horizontally elongated cantilevered support member would extend from the inner side of girder 900 for supporting the trolley rail. In all other respects, a bridge employing girder 900 would be identical to bridge 104.

Girder 900 has an enclosed interior space with a cross section of sufficient dimension to permit access to said interior by operating personnel. The on-board crane control mechanisms normally housed in cabinet 116, in this embodiment of the invention, are housed in girder 900. Girder 900 is made of plate and torsion box construction according to standard practice and formed of high tensile steel to provide maximum strength with a minimum of weight. In this regard, girder 900 has a rectangular cross section which includes horizontally elongated side members 940, 941, 942 and 943 and diaphragm members 944 spaced throughout the interior of girder 900 for reinforcing such side members. Girder 900 includes ventilation system 902 which includes electric drive motor 904 and blower 906. Air is drawn from conductor bus alleyway 126 through ventilation inlet shaft 908 which includes filter 910, circulates throughout the interior of girder 900, and is exhausted into hot canyon area 130 through filters 912 and exhaust grill 914. Ventilation system 902 is used to control the temperature within girder 900 and maintain a positive air pressure within girder 900 relative to the air pressure within hot canyon area 130 to prevent particulate radioactive matter emitted in hot canyon area 130 from entering girder 900. Girder 900 also includes modular stainless steel liners 916 which are positioned between diaphragm members 944 and distributed throughout the length of the interior space of girder 900. Liners 916 function as radiation barriers to protect the interior of girder 900 from line of site radiation as well as airborne radioactive particulate matter. Each of the liners 916 has a cubical construction which includes rounded corners. Girder 900 is adapted for housing the on-board components of close circuit television camera control system 370, radio control system 372 and motion control system 374 in the same manner as cabinet 116. Systems 370, 372 and 374 function in the same manner as described above and, accordingly, need not be further elaborated upon here. Access to girder 900 is provided through access door 920 which can be entered through conductor bus alleyway 126. Girder 900 also includes walkway 922 which is of sufficient dimension to permit access through it by operating personnel. In addition to access door 920, access can be gained to walkway 922 through access hatch 924 using ladder 926 and through auxiliary access door 928. Access hatch 924 and auxiliary access door 928 are only used in the event of emergency or when the crane is positioned in decontamination area 132 or maintenance area 134.

In another alternative embodiment of the present invention, hoist machinery cradle 950, which is illustrated in FIGS. 14 and 15, is provided for suppporting the lifting drum and drive mechanism for rotating the lifting drum of the trolley of the present invention. An advantage of employing hoist machinery cradle 950 is that cradle 950 along with the hoist machinery mounted on it can be facilitatingly mounted on or removed from the trolley of the present invention to enhance the maintenance of such trolley. To facilitate maintenance of the trolley, hoist machinery cradle 950 along with the hoist machinery mounted thereon is removed from the trolley and replaced by an identical cradle with hoist machinery mounted thereon. While the new hoist machinery is in use, the removed hoist machinery can be repaired. In the embodiment illustrated in FIGS. 14 and 15, hoist machinery cradle 950 includes U-shaped support frame 952 which bolts to and depends from the underside of side rail members 954 and 956 of the trolley with which cradle 950 is to be used. Hoist machinery 958 of cradle 950 includes lifting drum 960 which is supported by gear reducers 962 and 964. Gear reducers 962 and 964 are mounted on frame 952. Lifting drum 960 is rotated by electrically operated motor 966 which is mounted on frame 952. Extending in one direction from motor 966 is line shaft 968 which interconnects reducer 964 with motor 966. Clutch assembly 970 is positioned adjacent motor 966 and connected to motor 966 by line shaft 968. Electrically operated brake mechanism 972 is positioned between clutch assembly 970 and gear reducer 964 and is interconnected through clutch assembly 970 with motor 966 by line shaft 968. Line shaft 974 extends from motor 966 in the opposite direction of line shaft 968. Line shafts 968 and 974 have a common axis of rotation. Line shaft 974 interconnects gear reducer 962 with motor 966. Torque limiting clutch assembly 976 is positioned adjacent motor 966 and is connected to motor 966 by line shaft 974. Electrically operated brake mechanism 978 is positioned between clutch assembly 976 and gear reducer 962 and is interconnected through clutch assembly 976 with motor 966 by line shaft 974. The rotation of the drive shaft of motor 966 in one direction imparts rotational motion to gear reducers 962 and 964 which in turn causes lifting drum 960 to rotate clockwise. The rotation of the drive shaft of motor 966 in the opposite direction causes lifting drum 960 to rotate counterclockwise. Brake mechanisms 972 and 978 are provided for slowing or stopping the rotation of lifting drum 960. Brake mechanisms 972 and 978 are also provided for purposes of redundancy, either of such brake mechanisms can be used to lock lifting drum 960 in place in the event of failure of motor 960, clutch assemblies 970 or 976, line shafts 968 or 974, or one of the brake mechanisms 972 or 978. Frame 952 also includes brackets 980 and 982 which can be used for facilitatingly mounting or demounting cradle 950 on the trolley using, for example, a forklift truck.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A crane for use in a nuclear waste handling facility comprising:

a bridge of sufficient transverse dimension to span the width of the area being serviced by said crane;

means for moving said bridge along spaced rails extending longitudinally along opposite sides of said area being serviced; and crane control means including a control cabinet depending from cantilever means extending from said bridge;

said facility including stationary radiation barrier means extending longitudinally in spaced relationship to one of said rails, said barrier means being positioned between said bridge and said crane control means;

said barrier means including wall means with a horizontally elongated opening, said cantilever means extending from said bridge through said opening in said wall means, said wall means being positioned between said bridge and said control cabinet, the side of said wall means on which said control cabinet is positioned being adapted for operating at a positive pressure relative to the pressure of the side of said wall means on which said bridge is positioned;

said means for moving said bridge including:

main wheels comprising first and second primary wheel means, first and second secondary wheels means and first and second tertiary wheel means;

primary drive means including: a first primary drive comprising first primary wound rotor motor means and adapted for driving said first primary wheel means along one of said spaced rails; and a second primary drive comprising second primary wound rotor motor means and adapted for driving said second primary wheel means along the other of said spaced rails;

secondary drive means including: a first secondary drive comprising first secondary wound rotor motor means and adapted for driving said first secondary wheels means along one of said spaced rails; and a second secondary drive comprising second secondary wound rotor motor means and adapted for driving said second secondary wheel means along the other of said spaced rails; and teritary drive means including a first tertiary hydraulic motor adapted for driving said first teritiary wheel means along one of said spaced rails and a second tertiary hydraulic motor adapted for driving said second tertiary wheel means along the other of said spaced rails;

said primary, secondary and tertiary drive means being operatively independent of each other.

2. The crane of claim 1 wherein said bridge comprises a horizontally elongated rectangular structure comprising a pair of horizontally elongated girders connected by end ties.

3. The crane of claim 2 wherein each of said girders are of torsion box construction.

4. The crane of claim 1 wherein said first primary drive means further includes a first primary reducer connected to said first primary wound rotor motor means which motor means is adapted to drive said first primary wheel, and said second primary drive means further includes a second primary reducer connected to said second primary wound rotor motor means, which motor means is adapted to drive said second primary wheel.

5. The crane of claim 1 wherein said first secondary drive means further includes a first secondary reducer connected to said first secondary wound rotor motor means which motor means is adapted to drive said first secondary wheel, and said second secondary drive means further includes a second secondary reducer connected to said second secondary wound rotor motor means which motor means is adapted to drive said second secondary wheel.

6. The crane of claim 1 wherein said first primary drive means further includes a first primary gear reducer and a first primary brake means for braking said first primary wheel, and said second primary drive means further includes a second primary gear reducer and a second primary brake means for braking said second primary wheel.

7. The crane of claim 1 wherein said first secondary drive means further includes a first secondary gear reducer and a first secondary brake means for braking said first secondary wheel, and said second secondary drive means further includes a second secondary gear reducer and a second secondary brake means for braking said second secondary wheel.

8. The crane of claim 1 wherein said means for moving said bridge along spaced rails comprises traveling carriage means depending from said bridge.

9. The crane of claim 8 wherein said traveling carriage means comprises four traveling carriages depending from said bridge, two of said traveling carriages comprising wheel means adapted for travel along one of said spaced rails and the other two of said carriages comprising wheel means adapted for travel along the other of said spaced rails.

10. The crane of claim 9 wherein each of said carriages comprises two of said main wheels which are adapted for travel along the rail associated with its respective carriage and two auxiliary wheels, each of said auxiliary wheels being adapted for travel in a suspended mode above the rail associated with its respective carriage and extendable into contacting engagement with such rail.

11. The crane of claim 10 wherein the auxiliary wheels of said carriages are positioned between said main wheels.

12. The crane of claim 10 with spring means for retaining each of said auxiliary wheels in said suspended mode and hydraulic means for extending each of said auxiliary wheels into contacting engagement with the rail associated with the respective carriages of such auxiliary wheels.

13. The crane of claim 1 wherein said bridge comprises an end tie and said cantilever means comprises at least one cantilever beam extending from said end tie to said control cabinet.

14. The crane of claim 13 wherein said cantilever means comprises four cantilever beams extending from said end tie to said control cabinet.

15. The crane of claim 1 wherein said wall means is constituted of a material comprising concrete.

16. The crane of claim 1 wherein said control cabinet houses motion control means, radio control means and/or television control means.

17. The crane of claim 1 wherein said control cabinet is positioned in a conductor bus alleyway.

18. The crane of claim 1 with auxiliary control means for operating said bridge, said auxiliary control means being mounted on the exterior of said control cabinet.

19. The crane of claim 1 with microwave radio means communicating with said crane control means for controlling the operation of said crane.

20. The crane of claim 1 with ultra high frequency radio control means communicating with said crane control means for controlling the operation of said crane.

* * * * *